Oct. 24, 1944.                R. S. CURRY, JR                    2,360,851
                    ROTATING FIELD EXCITED FLUX VALVE
                         Filed Jan. 28, 1943
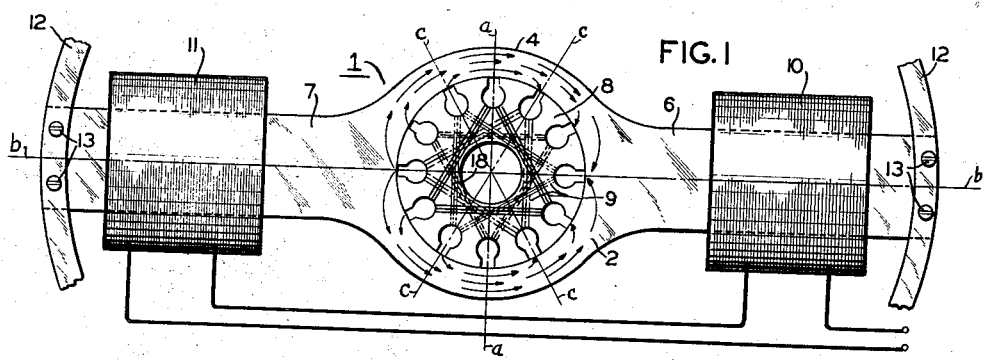
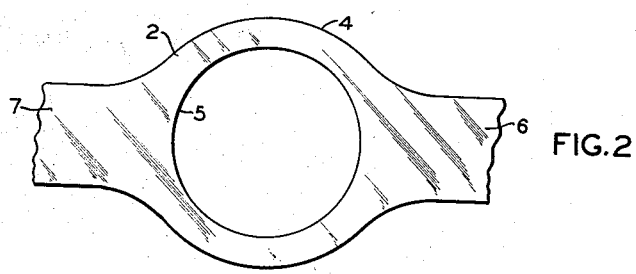
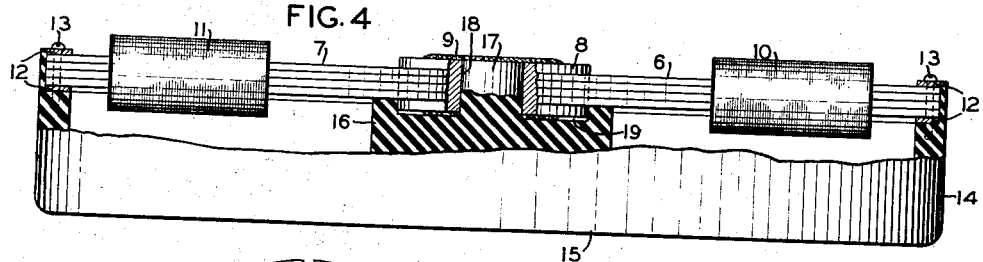
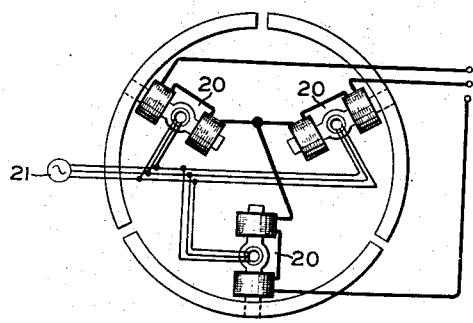
INVENTOR
R. S. CURRY, JR.
BY
Herbert H. Thompson
HIS ATTORNEY Patented Oct. 24, 1944

2,360,851

UNITED STATES PATENT OFFICE 2,360,851

ROTATING FIELD EXCITED FLUX VALVE

Robert S. Curry, Jr., Baldwin, N. Y., assignor to Sperry Gyroscope Company, Inc., Brooklyn, N. Y., a corporation of New York Application January 28, 1943, Serial No. 474,057

14 Claims. (Cl. 177—380)

Heretofore, flux valve designs have embodied a core of highly permeable magnetic material on which is mounted a pick-up or pick-up coils and an exciting winding. The exciting winding is of a single-phase character and, when connected to a pulsating source of electrical energy, causes the permeance of the core to vary, preferably in a highly saturated state near its saturation point, to thereby render the device sensitive to the earth's magnetic field or to any external, unidirectional field in which the flux valve may be placed. Primarily, the E. M. F.'s induced in the pick-up coil are produced by pulsing the unidirectional field. The E. M. F.'s induced in the pick-up coils will vary both in magnitude and phase with changes of the position of the axis of the pick-up coil angularly with respect to the unidirectional field.

Since the induced E. M. F. in the pick-up coils is dependent upon a variation or change in the premeance of the core, the wave form of the induced E. M. F. will depend upon the character of the change in the permeance of the core. Where a single exciting coil, connected to some source of alternating or pulsating current, is employed in exciting the core of a flux valve, the change or variation in the permeance of the core will not be sinusoidal and, therefore, the signal E. M. F. or the E. M. F. induced in the pick-up coils by the unidirectional field will not be sinusoidal in wave form. Furthermore, when the permeance varies in a non-sinusoidal manner, harmonics will appear in the output of the pick-up coils and produce errors in the indications, which the pick-up coils provide through the medium of their induced signal currents, of the relationship which the pick-up coils bear with respect to the direction of the external direct current field.

However, if the permeance of the core of a flux valve is varied in a sinusoidal manner, the signal output on the pick-up coils will be substantially free from interfering harmonics and will have a more nearly sinusoidal wave form, which is very desirable in devices of this character.

It is, therefore, a primary object of my invention to provide a flux valve in which the permeance of the magnetically permeable core thereof is varied in substantially a sinusoidal manner.

Another object resides in providing a flux valve in which the permeance of the core is varied by means of a rotating, exciting field which functions to produce and rotate a zone of relatively high degree of saturation within the core, in the manner of simple harmonic motion, to produce a sinusoidal change in the permeance of the core.

A still further object resides in the provision of a flux valve of the foregoing character in which the rotating zone of magnetic saturation is produced by a polyphase exciting winding which, when connected to an alternating current supply, is adapted to create a rotating field.

With the foregoing and other objects in view, my invention includes the novel construction and correlation of elements described below and illustrated in the accompanying drawing wherein a preferred embodiment is shown, and in which:

Fig. 1 is a plan view, some of the parts being broken away, of one embodiment of my invention;

Fig. 2 is a fragmentary plan view of the core;

Fig. 3 is a fragmentary elevation view of the core showing the exciting winding and a pick-up coil associated therewith;

Fig. 4 is an elevation view, part being broken away, of a flux valve and mounting therefore; and Fig. 5 illustrates diagrammatically one manner of relatively arranging my flux valve to provide a three-component signal output.

The flux valve, herein disclosed as a preferred embodiment of my invention and indicated generally at 1, comprises a core 2 which may include a plurality of superposed laminations 3, as shown in Fig. 3. Centrally thereof, the core comprises a generally annular or arcuate portion 4 which extends about an opening 5 therein (see Fig. 2). The core also comprises preferably integral leg portions 6 and 7 which are contiguous to the central portion 4 and extend laterally therefrom on diametrically opposite sides of the opening 5 in the core and in substantial alignment with each other. Slotted core 8, which is adapted to fit snugly within the opening 5 of the core 1, is wound with a polyphase, preferably three-phase, two pole winding, such as indicated generally at 9. The core 8, bearing the winding 9, is secured within the opening 5 of the core of the flux valve in any suitable manner, preferably being a push fit and wedged therein.

The polyphase winding 9 may be of the form ordinarily employed in polyphase motor stators, for example, a three-phase induction motor, and wound to produce a field which rotates at substantially a uniform angular speed. Therefore, the winding 9, when connected to a suitable source of polyphase alternating current, will produce a field which will provide a zone of high degree of magnetic saturation, for example and for an instant, in the region of the transverse axis a—a of the core 2. As the field rotates, this zone of saturation will move, let us say, in a clockwise direction and within the core 2, passing through the longitudinal axis b—b and thence through the transverse axis a—a.

The central, arcuate section 4 of the core is also preferably so designed as to cooperate with the rotating field produced by the polyphase exciting winding to produce a sinusoidal variation in permeance of the core. Accordingly, the section 4 diminishes in cross sectional area, measured in radial planes, as the a—a axis is approached, being a minimum on the axis a—a and substantially uniformly increasing in cross sectional area to the leg portions 6 and 7. The zone of high degree of saturation, produced by winding 9 and, for example, illustrated for an instantaneous position thereof as embraced between the radial dot-dash lines c—c, produces maximum saturation for the position illustrated. As this zone rotates toward the b—b axis and with uniformly increasing radial cross sections of core, the saturation decreases uniformly until the zone is centered on the b—b axis where minimum core saturation occurs. In further conformity with correct theoretical design, the width of the leg portions 6 and 7 should approximate or be substantially equal to the length of the zone of high saturation measured circumferentially of the exciting winding or, more precisely, at the outer periphery of the arcuate central core portion.

In operation, the field produced by the exciting winding rotates at a uniform angular rate, and the projection of this zone of saturation on a diameter such as the a—a axis will move in a simple harmonic manner. Therefore, the change of permeance in the core will likewise vary in a simple harmonic manner or sinusoidally.

The pick-up coils 10 and 11 are mounted upon the legs 6 and 7, respectively. Since the permeance of the core experiences a sinusoidal change, as hereinbefore explained, the form of the wave of the E. M. F. induced in these coils by the earth's magnetic field or an external unidirectional field will closely approximate a sinusoidal wave. Collector rings or horns 12 may be mounted on the ends of the legs 6 and 7 and secured to the core laminations by the screws 13 to increase the flux traversing the leg.

Fig. 3 serves to illustrate the preferred relation of the exciting winding and its core 9 relative to the core 2 of the flux valve when operatively fitted within the opening 5 therein, and Fig. 4 illustrates one form of support for a flux valve of the character herein described. For example, the support 14 may comprise a base 15 formed of non-magnetic, preferably electrical insulating material, and having a centrally disposed, up-standing stud 16. The stud 16 is provided with an up-standing, centering boss 17 which is adapted to be received within the central opening 18 of the core 9 and an annular depression 19 surrounding the centering boss 17 within which the core 8 and winding 9 thereon may fit.

When the flux valve of this invention is to be employed in, for example, a compass system or as a slave control for a gyro magnetic compass and a three-component signal output is desired, an assembly may be formed as shown in Fig. 5.

In this assembly, each of the three units indicated generally by the numeral 20 conforms in all material respects to the flux valve construction illustrated in Fig. 1, and each unit is preferably radially arranged with respect to each other and in fixed 120° angular relationship. The polyphase exciting windings of each unit are connected to a polyphase source of supply 21 and the secondary or pick-up coils of each unit are connected together and Y-connected with the pick-up coils of the other units, resulting in a three-component output designated generally at 22.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A flux valve comprising a core of permeable magnetic material, a pick-up coil operatively associated therewith, and a polyphase exciting winding associated with said core and so arranged with respect to said core as to produce, when energized from an alternating current source, a zone of high degree of magnetic saturation continuously rotating within said core.

2. A flux valve comprising a core of permeable magnetic material provided with an opening therein, a polyphase exciting winding mounted within said opening for producing, when energized from an alternating current source, a rotating magnetic field, said winding being so arranged with respect to said core that the flux of said field produces a zone of high degree of magnetic saturation continuously rotating within said core as said field rotates and about the opening therein, and a pick-up coil disposed about said core.

3. A flux valve comprising a core of permeable magnetic material provided with an opening therein, said core extending entirely about said opening and including a leg portion extending laterally from the opening, a core having a polyphase winding thereon closely fitted within said opening and so arranged with respect to said core as to produce, when energized from an alternating current source, a zone of high degree of magnetic saturation continuously rotating within said first mentioned core and about the opening therein, and a pick-up coil mounted on said leg portion of the core.

4. A flux valve comprising a core of permeable magnetic material provided with a circular opening therein, said core extending entirely about said opening and including leg portions extending laterally from said opening and from diametrically opposite sides thereof in substantial alignment, pick-up coils mounted on each leg portion, and means for producing and rotating a zone of high degree of magnetic saturation in said core and about said opening therein.

5. A flux valve comprising an elongated core of permeable magnetic material, a pick-up coil disposed about the longitudinal axis thereof, and means for saturating to a relatively high degree said core in a zone along a transverse axis of said core and in spaced relation to said pick-up coil and for rotating said zone through said core whereby substantially sinusoidally to vary the permeance of said core in the zone thereof adjacent said pick-up coil.

6. A flux valve comprising a relatively thin, substantially flat and elongated core of permeable magnetic material, a polyphase winding arranged within a central portion of the core, and pick-up coils disposed about the end portions of said core contiguous to the central portion thereof, the side edges of the core extending laterally outwardly from the end portions and about the polyphase winding, and the width of the core ends being substantially equal to the length of the zone of the highest degree of magnetic saturation produced in said core by said polyphase winding and measured circumferentially of said polyphase winding.

7. A flux valve comprising an elongated core of permeable magnetic material having a generally arcuate central portion and leg portions contiguous thereto and extending in substantially aligned relation from diametrically opposite sides thereof, said central portion having a central, cylindrical opening therein, a cylindrical core having a polyphase winding thereon secured in said opening, said winding being so arranged relative to said core as to produce, when energized from an alternating current supply, a zone of magnetic saturation of high degree continuously rotating within said elongated core and about the opening therein, and pick-up coils mounted on the leg portions of the core.

8. A flux valve comprising an elongated core of permeable magnetic material having a generally arcuate central portion and leg portions contiguous thereto and extending in substantially aligned relation and longitudinally from diametrically opposite sides thereof, said central portion having a central, cylindrical opening therein, said central core portion lying about said opening and between said leg portions diminishing in radial cross-sectional area toward the transverse axis of said core passing through the center of said opening, a core having a polyphase winding thereon secured in said opening, said winding being arranged, when energized from an alternating current supply, to produce a zone of magnetic saturation of high degree continuously rotating within said elongated core and about the opening therein, and pick-up coils mounted on the leg portions of the core.

9. A flux valve comprising a core of permeable magnetic material, a pick-up coil disposed about the longitudinal axis thereof, and means for producing a rotating magnetic field, said means and core being so constructed, correlated and relatively arranged that said field produces a zone of magnetic saturation passing transversely of said core as said field rotates.

10. A flux valve comprising a core of permeable magnetic material, a pick-up coil disposed about the longitudinal axis thereof, and means for producing a rotating magnetic field having its axis of rotation substantially normal to said core, said core being disposed within and subjected to said magnetic field.

11. A flux valve comprising a core of permeable magnetic material, a pick-up coil disposed about the longitudinal axis thereof, and means disposed within and intermediate the side edges of said core for producing a rotating magnetic field whereby to produce a zone of high degree of magnetic saturation continuously rotating within said core and passing as it rotates through the transverse and longitudinal axes thereof.

12. A flux valve comprising a core of permeable magnetic material having a central core portion and a leg portion extending laterally therefrom, a pick-up coil disposed about the leg portion, and means including a winding for producing a rotating magnetic field rotating at substantially uniform angular velocity, said winding and core being so correlated and relatively arranged that the flux of said field will produce a zone of magnetic saturation rotating within the central portion of said core whereby to produce substantially a sinusoidal variation in the permeance of said core leg.

13. A flux valve comprising a core of permeable magnetic material, a pick-up coil disposed about the longitudinal axis thereof, and means disposed between the sides of said core for producing a rotating magnetic field, said core being subjected to said field and so disposed therewithin that a zone of high degree of saturation will pass transversely of said core between the said sides thereof.

14. A flux valve comprising a core formed of thin, flat strip permeable magneteic material, having substantial width, a pick-up coil associated therewith, and means for producing a rotating, bi-polar magnetic field, said means and core being so correlated and relatively arranged that the poles of said field rotate transversely across the width of said core.

ROBERT S. CURRY, Jr.